June 27, 1950 W. E. HAMPTON ET AL 2,512,933

ROTATABLE TELEPHONE STAND

Filed Nov. 21, 1947

INVENTORS.
WARREN E. HAMPTON
LEO J. MURRAY
BY Howard J. Whelan.
ATTORNEY

UNITED STATES PATENT OFFICE 2,512,933

ROTATABLE TELEPHONE STAND

Warren E. Hampton and Leo J. Murray, Baltimore, Md., assignors of thirty-three and one-third per cent to Jaunita M. Hampton, Baltimore, Md.

Application November 21, 1947, Serial No. 787,454

1 Claim. (Cl. 45—.5)

This invention relates to telephone equipment and more especially to a support for a desk telephone set.

The conventional telephone set used on desks is often used by more than one person. Persons in such an instance are usually on opposite sides of the desk or table and have to reach over to pick up the instruments with their hands and manipulate them to make them convenient to operate. The telephone set has to be turned around so it can be dialed and spoken into by each person. This requires that each stand up in his turn to use it, and make several uncomfortable movements to get it in the proper position and location. The process is somewhat slow and invites entanglement of the wires to the instrument.

It is therefore an object of this invention to provide a new and improved support for a desk telephone set that will avoid one or more disadvantages and limitations of the prior art.

Another object of the present invention is to provide a new and improved support for a desk telephone set that will hold the set securely yet permit the set to be rotated horizontally through a complete circle.

An additional object of the invention is to provide a new and improved support for a desk telephone set that will be convenient to use, easily operated and non-injurious to the desk top.

Other objects will be evident as the invention is more fully described.

For a better understanding of the invention and the objects thereof, reference is made to the accompanying drawings which illustrate a particular form of the invention by way of example, and which are described in the following specification. The scope of the invention is emphasized in the claim.

In the drawings.

Similar reference numerals pertain to the same parts throughout the several views.

Figure 1:
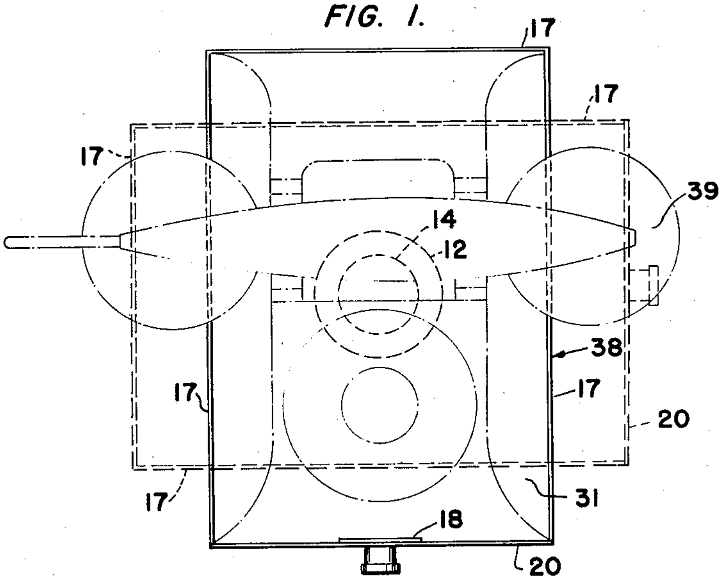
Figure 1 is a plan view of a desk telephone support unit embodying this invention.
Figure 2:
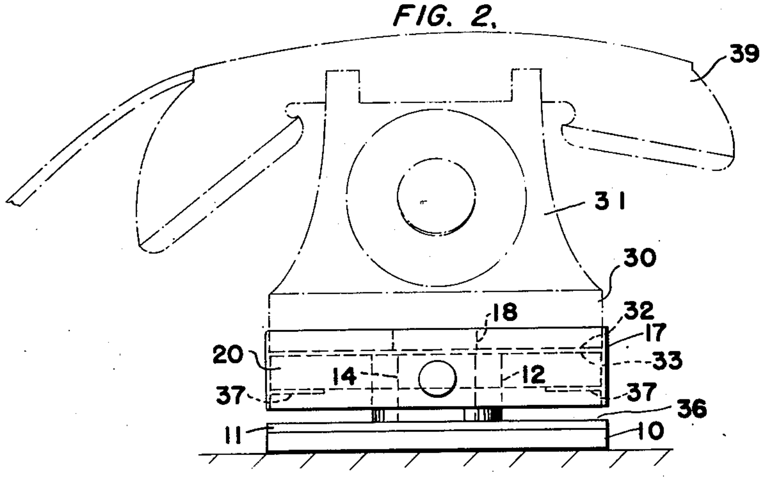
Figure 2 is a front elevation of the support unit, shown in Figure 1.
Figure 3:
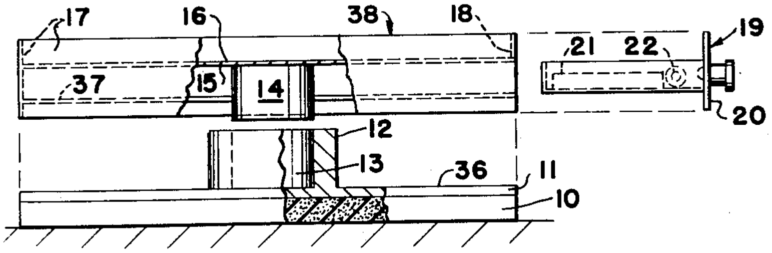
Figure 3 is a side elevation of the support unit, with parts in exploded form.

The support unit consists of a rectangular resilient mat 10 on which a flat base plate 11 is cemented. This base plate 11 has a cylindrical collar 12 with a central hole 13 in it mounted on its upper surface. Fitting into the hole 13 and rotatable therein is a cylindrical swivel post 14. This fitting 14 is fastened to the underneath surface 15 of a flat tray plate 16. The tray plate 16 is provided with flat side walls 17 which extend T-like around it on three sides to laterally enclose its upper and lower surface portions 32 and 33 respectively. The front however is left open except for a short lip 18 extended upwardly at the top surface and located at the middle, to act as a stop to prevent the telephone from sliding off the tray plate 16. Below the tray plate 16 and parallel thereto are channel strips 37 sufficiently spaced therefrom to permit the insertion and movement of a drawer 19. This drawer has its front wall 20 of similar size and material to that of the side walls 17 and butts up against them when the drawer is closed, against the stop 18. The drawer portion fits under the plate 16 when pushed in. The drawer 19 slides on the channel strips 37 which extend under the sides of the drawer. The drawer is not long enough to strike against the swivel post 14 when pushed in. A pad 21 and pencil 22 are provided in the drawer 19 for the convenience and use of the operator utilizing the device.

It can be appreciated that the upper portion of the unit is a rectangular tray in which the base 30 of a conventional telephone desk set 31 can be placed and fitted. The side walls 17 and stop 18 hold the set 31 so it will not fall out easily. When in use the tray 38 is rotatable over the base plate 11 and mat 10 by reason of the post 14 positioned in the collar 12 and the manner in which the upper end surface of collar 12 engages against the undersurface 33 of the tray plate 16. When the telephone set 31 is nested in the tray and ready to be used, the operator simply picks up the hand piece 39 in the customary manner if it is faced towards him, or turns it on the swivel post 14 until it is so directed. The next user simply turns the telephone set 31 and tray 38 towards him before he picks up the telephone hand set 39 in the same manner.

The unit affords a quick and convenient use for the telephone set and supports it sufficiently above the desk top to prevent it interfering with the papers and other articles thereon. The telephone set may be located in any convenient place because of its portability and can be pushed around on the desk surface without injuring it by reason of the rubber mat underneath. This mat also cushions the set so it will be less noisy.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claim. Having thus described the invention, what is claimed is:

A revolving stand for a telephone desk set comprising a tray having a bottom wall of rectangular shape, side walls extending along three sides of said bottom walls and forming skirt portions above and below said bottom wall and defining upper and lower compartments, the upper compartment being adapted to receive the base of the telephone set, an extension protruding upwardly from said bottom wall in the upper compartment, on the open side thereof, to prevent movement of the telephone set towards the open side, channel strips on the under side of said bottom wall extending across the lower comparement towards the open side thereof, a drawer carried by said channel strips and movable thereon, a cylindrical swivel post secured to the under side of said bottom wall centrally thereof and extending downwardly through the lower compartment, a flexible mat, a base plate secured thereto, and a cylindrical boss extending centrally and upwardly of said base plate, said boss having a cylindrical opening therein adapted to receive said aforementioned cylindrical post for free swivelling movement.

WARREN E. HAMPTON.
LEO J. MURRAY.

REFERENCES CITED

The following references are of record in the file of this patent:

UNITED STATES PATENTS

| Number | Name | Date |
|---|---|---|
| 888,158 | Glass | May 19, 1908 |
| 936,281 | Woolsey | Oct. 5, 1909 |
| 1,767,003 | Kaplan et al. | June 24, 1930 |
| 2,283,690 | Munson | May 19, 1942 |